(12) United States Patent
Kuijk et al.

(10) Patent No.: US 7,268,858 B2
(45) Date of Patent: Sep. 11, 2007

(54) TOF RANGEFINDING WITH LARGE DYNAMIC RANGE AND ENHANCED BACKGROUND RADIATION SUPPRESSION

(75) Inventors: Maarten Kuijk, Berchem-Antwerpen (BE); Daniël Van Nieuwenhove, Hofstade (BE)

(73) Assignee: Vrije Universiteit Brussel, Brussel (BE)

( * ) Notice: Subject to any disclaimer, the term of this patent is extended or adjusted under 35 U.S.C. 154(b) by 54 days.

(21) Appl. No.: 11/171,402

(22) Filed: Jul. 1, 2005

(65) Prior Publication Data

US 2006/0000967 A1 Jan. 5, 2006

(30) Foreign Application Priority Data

Jul. 1, 2004 (EP) ................... 04447162

(51) Int. Cl.
*G01C 3/08* (2006.01)
(52) U.S. Cl. ................. 356/5.01; 356/5.02; 356/5.1
(58) Field of Classification Search ............ 356/5.01
See application file for complete search history.

(56) References Cited

U.S. PATENT DOCUMENTS 5,428,439 A * 6/1995 Parker et al. .............. 356/5.01
5,742,379 A * 4/1998 Reifer ....................... 356/5.07

FOREIGN PATENT DOCUMENTS

| DE | 34 31 880 | 7/1985 |
|----|-----------|--------|
| DE | 195 13 823 | 10/1996 |
| DE | 197 04 496 | 3/1998 |
| WO | 98/10255 | 3/1998 |
| WO | 99/60629 | 11/1999 |
| WO | 2004/012269 | 2/2004 |

OTHER PUBLICATIONS

Lange, R., et al: "Solid-State Time-of-Flight Range Camera", IEEE Journal of Quantum Electronics, IEEE Inc., New York, U.S., vol. 37, No. 3, Mar. 2001, pp. 390-397.

* cited by examiner

*Primary Examiner*—Thomas H. Tarcza
*Assistant Examiner*—Luke D. Ratcliffe
(74) *Attorney, Agent, or Firm*—Bacon & Thomas, PLLC (57) ABSTRACT

A method for measuring time of flight of radiation includes emitting modulated radiation in response to a first modulation signal, projecting the modulated radiation onto a scene, receiving radiation, the received radiation comprising a first portion being the modulated radiation reflected by the scene and a second portion being background radiation, converting the received radiation into a signal on a conversion node, the signal on the conversion node having a first and second signal component, the first signal component being indicative of the background radiation and the second signal component being dependent on the reflected modulated radiation, and determining the time of light of the radiation based on the second signal component. A corresponding device is also provided.

21 Claims, 9 Drawing Sheets

TOF RANGEFINDING WITH LARGE DYNAMIC RANGE AND ENHANCED BACKGROUND RADIATION SUPPRESSION

TECHNICAL FIELD OF THE INVENTION

The present invention relates to the field of distance measuring sensors and methods for time-of-flight (TOF) measurements. More particularly the present invention relates to such sensors and methods adapted to achieve efficient background radiation rejection at variable background radiation conditions. The radiation may be visible or infrared light for example.

BACKGROUND OF THE INVENTION

The basic principle of using time-of-flight (TOF) measurements for range finding applications is to measure how long it takes for radiation, e.g. photons to travel over an unknown distance. The unknown distance can then be deduced from the measured time of flight in combination with the known speed of the radiation such as light.

Many ways of how to modulate a light source for such TOF measurements, and which strategy to follow for making the distance measurement are known to a person skilled in the art and are described in patents and scientific literature. Most of these range-finding systems use a receiver in which a mixer is used to demodulate an incoming photocurrent for finding e.g. a phase or a time period for distance estimation. The photocurrent is typically mixed with a reference signal.

There are basically two ways to achieve this mixing. A first way is to use transistors in a multiplier configuration, for mixing the photocurrent signal with the reference signal. WO 2004/012269 describes a readout circuit using this technique. A light source is pulsed to illuminate a scene, for example comprising one or more objects, and the phase difference between the light reflected from the scene and the original phase of the light source is measured. In order to measure the phase difference, a CMOS photosensor may be used to receive the reflected light and store charge generated during different portions of time in different storage nodes or pixel cells. The difference between the amount of charge stored in different storage nodes can be used to determine the phase difference between the original light illuminating the scene and the light reflected from the scene. This phase difference can in turn be used to determine the distance to the scene. This and other transistor mixing methods will be called "transistor-mixing-methods".

A second way of achieving the mixing is by redirecting photo-generated minority carriers in the substrate, before they are detected by a diode-junction or by a potential well. WO 98/10255 and WO 99/60629 show such methods and corresponding devices for determining the phase and/or amplitude of incident modulated light. By applying a reference modulation voltage over two photo-gates, the generated minority carriers in the substrate arrive preferentially at one of two detector accumulation zones. In WO 98/10255, these accumulation zones are potential wells, created by a voltage on an adjacent accumulation gate. In WO 99/60629, these accumulation zones are pn-junctions. In EP-03077744.5 co-pending herewith, a bipolar alternative and enhanced version is described using a reference majority current for redirecting the photo-generated carriers in the substrate towards detecting junctions. These second ways of mixing before diode junction detection will be called "substrate-mixing-methods".

Depending on the target specifications, a substrate-mixing-method or a transistor-mixing-method will be preferred.

With both mixing methods it remains a problem to separate signals originating from background light efficiently from signals originating from TOF-light. The background light that is present on an area in a scene of which the distance is to be measured, can be six orders of magnitude larger than the light present on this same area and originating from the modulated light source. It is known from literature to reduce this large difference to some extent by using an optical filter, which attenuates the visible background light from the TOF light based on wavelength differences. In this way a reduction of an order of magnitude can be obtained. With a narrow-band optical pass filter and using a narrow-band laser light source, possibly two orders of magnitude can be overcome. However, LED light sources are preferred light sources for future TOF range finders, since they may emit Watts of light, whereas lasers may only emit milli-Watts of light in free space for eye-safety reasons.

Further it is difficult to make low-pass filters with a −3 dB frequency in the 10 Hz-10 kHz range for range finding systems on a small silicon circuit area, such that each camera pixel can have its own averaging filter for averaging out the noise after the mixer.

Therefore, no readily usable solution is known for separating signals originating from background light from signals originating from TOF-light by means of a small circuit while not deteriorating the signal to noise ratio and still achieving 3D camera operation.

AIM OF THE INVENTION

It is an aim of the present invention to improve range finding methods and systems based on TOF measurements.

It is a further aim of the present invention to obtain improved range finding methods and systems based on TOF measurements using small area circuits supporting 2D-arrays of rangefinders, to thereby provide 3D-cameras for many applications.

SUMMARY OF THE INVENTION

The above objectives are accomplished by a method and a device according to the present invention.

In a first aspect, the present invention relates to a method for measuring time of flight of radiation. The method according to the present invention comprises emitting modulated radiation in response to a first modulation signal, projecting the modulated radiation onto a scene, receiving radiation, the received radiation comprising a first portion being the modulated radiation reflected by the scene and a second portion being background radiation, converting the received radiation into a signal on a conversion node, the signal on the conversion node having a first and a second signal component, the first signal component being dependent on the reflected modulated radiation and the second signal component being indicative of the background radiation, determining a small signal component of the first signal component, following the reflected modulated radiation (12), and determining the time of flight of the radiation based on the small signal component of the first signal component.

It is an advantage of the present invention that signals originating from background light can be efficiently separated from signals originating from TOF light.

Converting the received radiation may comprise conversion of the received radiation into a radiation induced current signal. A method of the present invention may furthermore comprise converting the radiation induced current signal into the first and the second signal component, the first and the second signal components being voltage signal components. Alternatively, a method according to the present invention may furthermore comprise mixing the radiation induced current signal with a second modulation signal and converting the mixed signal into the first and second signal components. In this case the radiation induced current signal consists of charge carriers flowing in a substrate, and the mixing of the radiation induced current signal with the second modulation signal may be performed in the substrate. The second modulation signal may comprise substantially the same modulation as the first modulation signal, but is time-shifted.

The first voltage signal component may consist essentially of the small signal voltage on the conversion node. The second voltage signal component may consist essentially of the average voltage on the conversion node.

Converting the received radiation into the first and the second signal components may be carried out with a first and a second conversion gain respectively. The first conversion gain may be increased for decreasing background radiation levels. The first conversion gain may be up to orders of magnitude higher than the second conversion gain.

In a second aspect, the present invention provides the use of a method according to the present invention for a distance measurement.

In a third aspect, the present invention provides a device for measuring time of flight of radiation. The device of the present invention comprises a radiation emitting source, a modulating device for modulating, in response to a first modulation signal, radiation emitted by the radiation emitting source, a radiation receiver for receiving radiation, the received radiation comprising a first portion being the modulated radiation reflected by a scene and a second portion being background radiation, a conversion means for converting received radiation into a signal on a conversion node, the signal on the conversion node having a first and a second signal component, the first signal component being dependent on the reflected modulated radiation and the second signal component being indicative of the background radiation, and a calculation unit for determining the time of flight of the radiation based on the first signal component.

According to this aspect of the present invention, the conversion means is adapted for generating a small signal component of the first signal component, the small signal component following the reflected modulated radiation. The calculation unit is adapted to determine the time of flight of the radiation based on the small signal component of the first signal component.

The conversion means may comprise a photodetector for converting the received radiation into a radiation induced current signal. The conversion means may also comprise amplifying means for amplifying the first portion of the received radiation in order to generate the first signal component.

A device according to the present invention may furthermore comprise a variable transimpedance converter for converting the radiation induced current signal into the first and the second signal components, the first and the second signal components being voltage signal components.

A device according to the present invention may furthermore comprise mixing means for mixing said radiation induced current signal with a second modulation signal and a converter means for converting the mixed signal into the first and second signal components. The second modulation signal may comprise substantially the same modulation as the first modulation signal, but is time-shifted.

A device according to the present invention, wherein the conversion means has a first and a second conversion gain for converting the received radiation into the first and the second signal components respectively, may furthermore comprise a gain input terminal for influencing the second conversion gain. This is useful for increasing the second conversion gain for decreasing background radiation levels. The second conversion gain may be up to orders of magnitude higher than the first conversion gain.

A device according to the present invention may furthermore comprise a low-pass filter. The low-pass filter may use a MOS-transistor in its triode region as a means for achieving a large resistance. Alternatively, the low-pass filter may use a MOS-transistor in its sub-threshold regime as a means for achieving a large resistance. In still an alternative embodiment, the low-pass filter may use a parasitic current leak for achieving a low −3 dB corner frequency of the filter.

In a device according to the present invention, the low-pass filter may use a polysilicon-polysilicon capacitor that is at least partially transparent for the first portion of received radiation.

An advantage of the present invention can be improvement of the dynamic range of allowed background illumination on the scene and improvement of the dynamic range of the sensed modulated light and hence an improvement in the range of distances that can be measured.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

In the different drawings, the same reference figures refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The description will be given in function of visible light as radiation. However, other kinds of radiation could be used as well, such as for example infrared or near infrared light since it can be detected by CMOS detection junctions.

It is to be noticed that the term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the most relevant components of the device are A and B.

Similarly, it is to be noticed that the term "coupled" should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The invention will be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims. It will be clear for a person skilled in the art that the present invention is also applicable to similar devices that can be configured in any transistor technology, including for example, but not limited thereto, CMOS, BICMOS, Bipolar and SiGe BICMOS technology.

Furthermore the findings of the present invention are explained with reference to PMOS and NMOS transistors as an example, but the present invention includes within its scope a complementary device whereby PMOS and NMOS transistors become NMOS and PMOS, respectively. A skilled person can make such modifications without departing from the true spirit of the invention.

Figure 1:
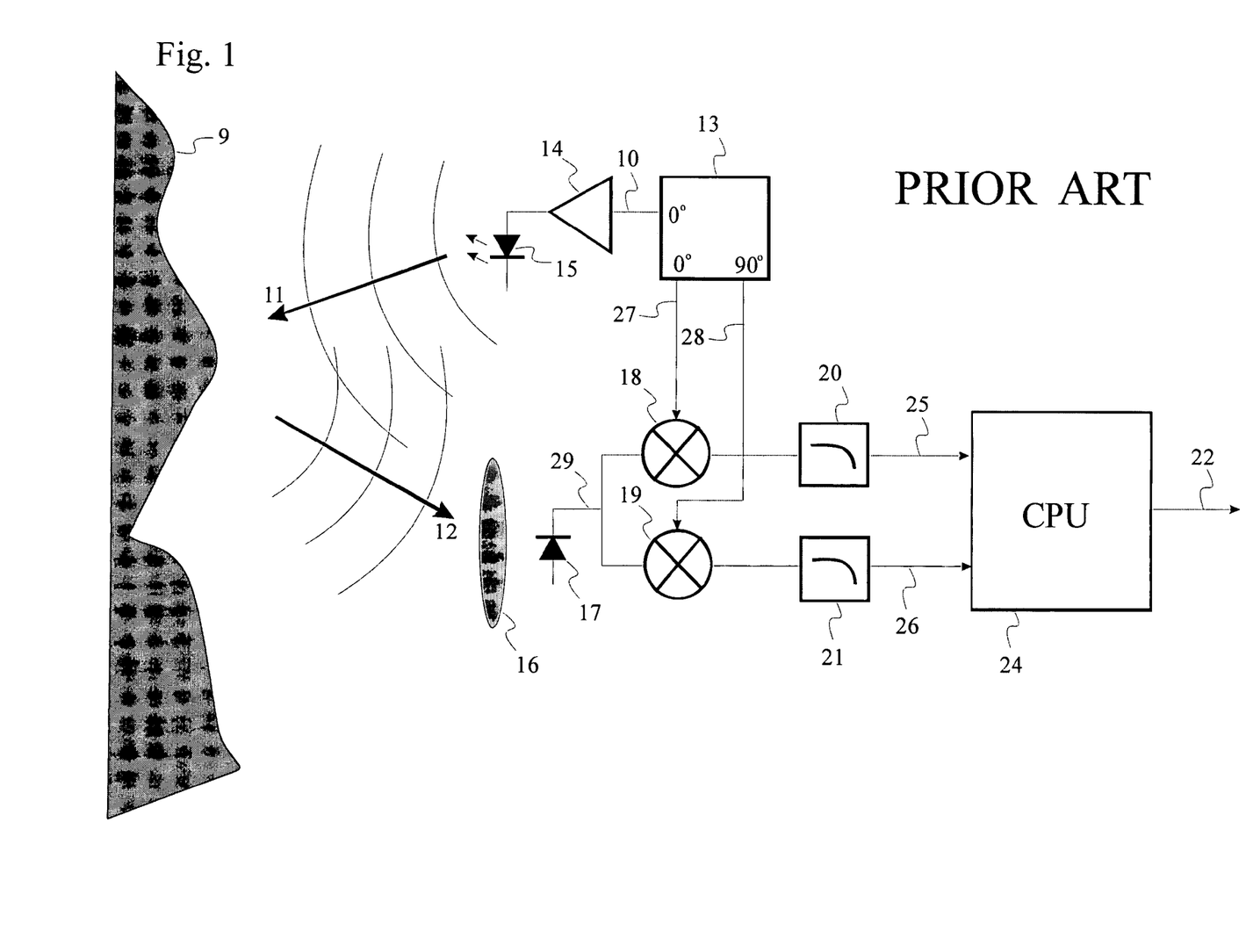
FIG. 1 shows a prior art TOF measurement system based on transistor mixing.

FIG. 1 shows a conventional way for performing time of flight (TOF) distance measurements for e.g. measuring the distance from a scene 9, by means of a transistor-mixing-method.

A light source 15 is provided, which emits light when being driven. A clock generator 13 generates a first clock signal and puts it on a buffer input node 10, thus driving a buffer 14 that modulates the light source 15. The light source 15 can be any light source that has enough bandwidth to follow the implied modulation, such as for example a Light Emitting Diode (LED) or a Laser, or arrays of light sources that are modulated simultaneously. By light source 15 emitted modulated light 11 reflects partly on the scene 9, thus generating reflected modulated light 12 imaged by an optical focussing system such as a lens 16 before incidence on a standard pn- or pin-detector 17. In CMOS typically an N-well is used as one terminal of the detector 17 and the substrate as the other terminal (typically connected to ground). Light impinging on the detector 17 generates an electrical photocurrent signal 29. The photocurrent signal 29 from detector 17 is demodulated by means of a first mixer or multiplier 18 and a second mixer or multiplier 19. In case of a transistor-mixing-method, transistors are used in a multiplier configuration. For demodulation purposes, clock generator 13 generates a second clock signal or reference signal on a second node 27 and a third clock signal or reference signal on a third node 28, the second and third clock signals having a 0° and 90° phase relation with respect to the first clock signal on the buffer input node 10. Demodulation is achieved by mixing or multiplying the output signal 29 from detector 17 with the second and third clock signals on nodes 27 and 28 in first and second multipliers 18 and 19 respectively. In the present case of a transistor-mixing-method, the obtained photocurrent signal 29 is mixed with the second and third clock signals by means of transistors. The output signals of the first and second multipliers 18 and 19 are then low pass filtered in low pass filters 20 and 21 respectively, and from the resulting low pass filtered signals 25 and 26 respectively, a calculating means such as CPU 24 can calculate the phase lag between both low pass filtered signals 25, 26 using for example arc-tangents functions of the ratio of these low pass filtered signals 25, 26. An output signal 22 of the CPU is then a measure for the distance between a TOF measurement device comprising a light source 15 and a detector 17 on the one hand, and a scene 9 on the other hand.

A 1-MHz clock signal allows measurement of distances unambiguously between 0 m and 150 m, a 10 MHz clock allows measurement unambiguously up to 15 m, and a 100 MHz clock allows unambiguous measurements up to 1.5 m.

Figure 2:
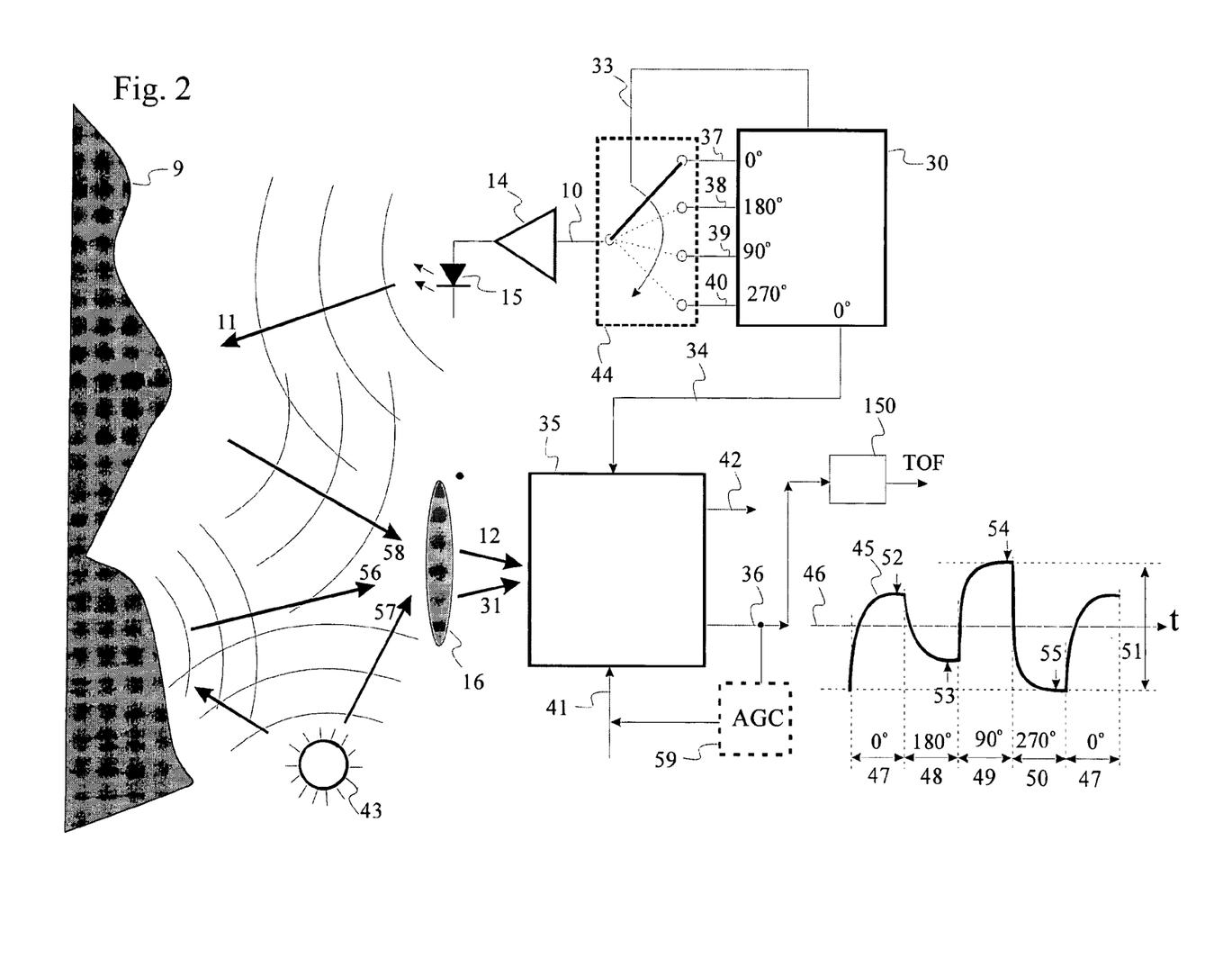
FIG. 2 shows a first preferred embodiment of a method according to the present invention valid for both transistor-mixing-methods and substrate-mixing-methods at top level, using a demodulator module 35.

FIG. 2 shows a preferred top-level embodiment of a range finding system according to the present invention for use with any of the transistor-mixing-methods or the substrate-mixing-methods. The range finding system comprises a light source 15 for emitting light 11 onto a scene 9, preferably focussed onto an area of interest, where the light is reflected, and a demodulator module 35 for receiving reflected light. In order for the light source 15 to emit modulated light, a signal generator 30 is provided. This signal generator 30 generates first to fifth clock signals, the second to fifth clock signals having a 0°, 180°, 90° and 270° phase relation respectively with the first clock signal. The second to fifth clock signals are delivered onto second to fifth nodes 37, 38, 39, 40 respectively. A person skilled in the art can also consider using other or more clock phases in the operation scheme, more clock phases probably leading towards better measurement precision in exchange for a longer measurement time. Alternatively, instead of modulating by means of phases of a clock signal, a person skilled in the art can also consider transmitting a pseudo random bit stream and mixing with a set of delayed and/or inverted same pseudo random bit streams. The use of pseudo random bit streams, sometimes referred to as pseudo-noise is known in literature by a person skilled in the art. In that case, instead of the first and second clock signals it is advised to use a pseudo random pattern, instead of the third clock signal use the same pseudo random pattern but bitwise inverted and instead of the fourth clock signal, the same pseudo random pattern but delayed by a bit period and instead of the fifth clock signal, the same pseudo random pattern but inverted and delayed by a bit period.

The signal generator 30 also generates a switch-determining signal 33 that is determining for a selector 44 to select between the second to fifth clock signals. It is preferred that the selector 44 is switching sequentially between these four clock signals, thus sequentially connecting a buffer input node 10 of a buffer 14 with second to fifth nodes 37, 38, 39, 40 of the clock generator 30. At each of these positions, selector 44 can stay connected for a relaxation period of e.g. 1 ms. The shorter this relaxation period is chosen, the more data a connected calculation unit has available for interpretation per unit of time. Assuming a larger relaxation period assumes having better integration capability at the level of the pixel's low-pass filters 71. The buffer 14 drives the light source 15 that emits modulated light 11 onto the scene 9, preferably focused on the area of interest. Part of this light will be reflected, thus generating reflected light 58. This reflected light 58 then arrives on an optical focussing system such as a lens 16, through which it is imaged or focussed on the demodulator module 35 where the incident fraction is called the reflected modulated light (ML) 12. Direct light 57 and indirect light 56, both originating from secondary light sources 43 not intended for the TOF measurement, will impinge on the optical focussing system 16 and thus on the demodulator module 35 as well. This light incident on demodulator module 35 will be called background light (BL) 31. Light sources 43 generating BL include incandescent lamps, TL-lamps, sunlight, daylight, or whatever light that is present on the scene 9 and does not emanate from the light source 15 for TOF measurement. An aim of the present invention is to take the signal from this BL 31 into account in the subsequent analog signal processing, thus optimising the distance readout range and precision.

The first clock signal generated by signal generator 30 on first node 34 is preferably permanently oscillating at a basic frequency of e.g. 10 MHz, assuming an unambiguous range-finding distance of 15 meter. Other unambiguous distances use preferably other oscillating frequencies as can be calculated by a person skilled in the art. The second to fifth clock signals oscillate with the same frequency, but have a 0°, 180°, 90° and 270° phase relation with the clock signal on first node 34. The first clock signal on the first node 34 is applied to an input port of the demodulator module 35.

Figure 3:
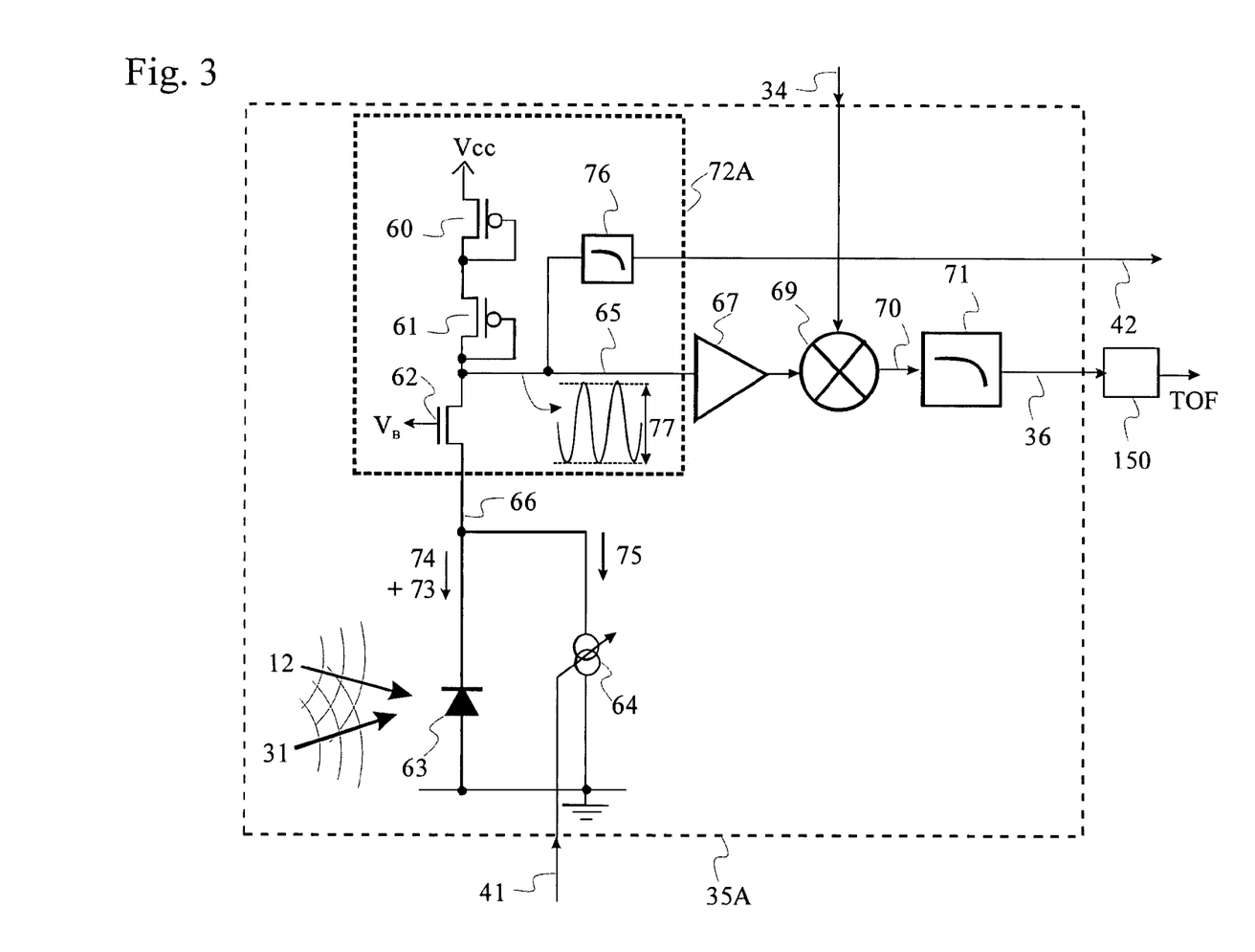
FIG. 3 shows a preferred demodulator module 35A based on a transistor-mixing-method with variable transimpedance converter 72A.
Figure 4:
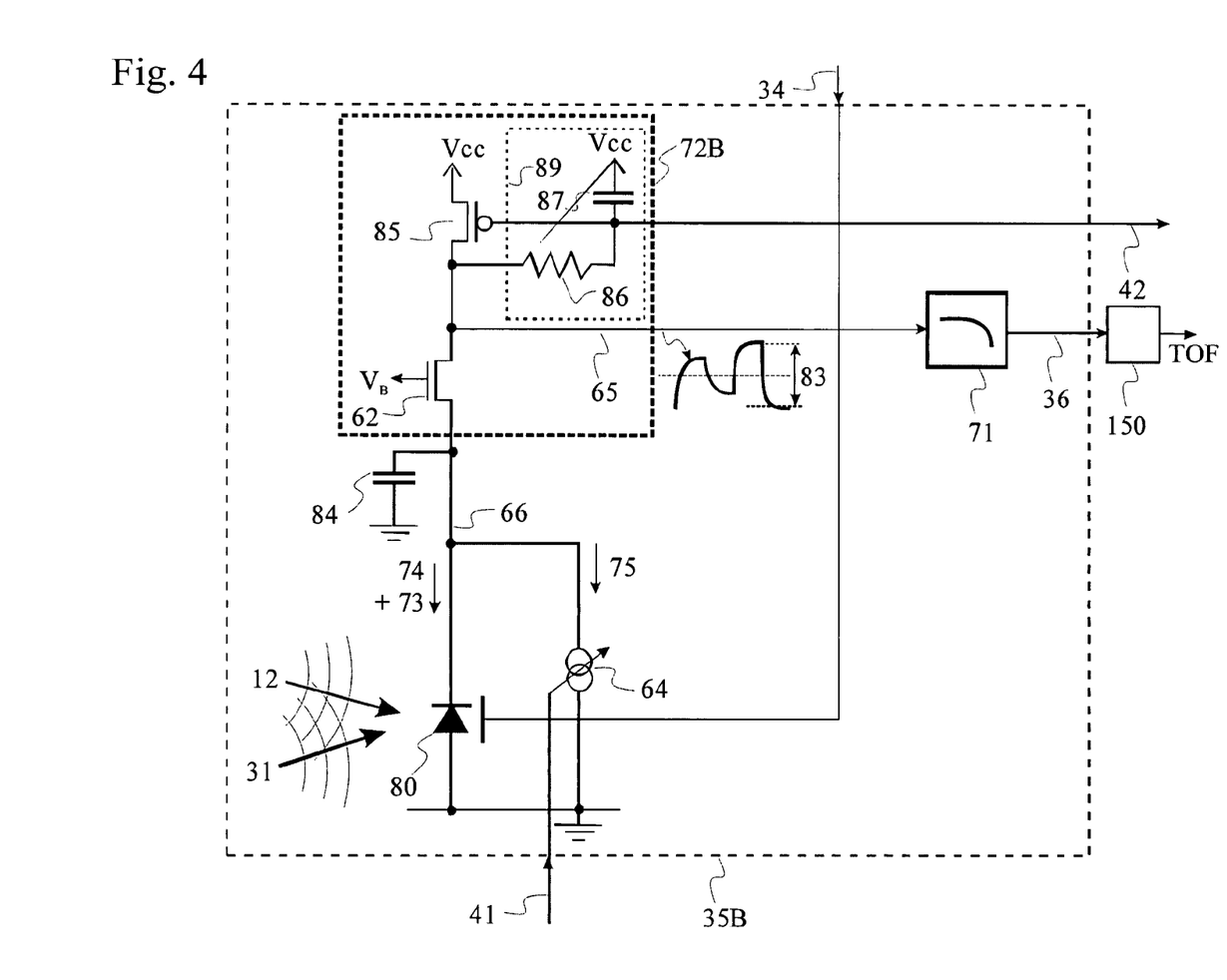
FIG. 4 shows a preferred demodulator module 35B based on a substrate-mixing-method with variable transimpedance converter 72B.

FIGS. 3 and 4 illustrate embodiments of demodulator modules 35, indicated as a demodulator module 35A based on a transistor-mixing-method in FIG. 3 and as a demodulator module 35B based on a substrate-mixing-method in FIG. 4.

ML 12 and BL 31 impinge onto a photodetector 63, 80 internal to demodulator module 35A, 35B and generate, respectively, an ML-current 73 and a BL-current 74, which are current responses to the impinging BL 31 and ML 12. As already stated earlier, the BL 31 can induce BL-current 74 up to 6 orders of magnitude higher than the ML-current 73 induced by the ML 12 received for TOF measurements. Demodulator module 35 has mixing means to generate the mixing products that are internally low-pass filtered in a low-pass filter 71. The averaged mixing product is available in a sequential form synchronised with selector 44 at output node 36, where it can be sampled at the end of each relaxation period (e.g. each millisecond) by sample-and-hold circuitry (not represented in the drawings) and digitised for further digital signal treatment in a subsequent digitising means or calculation unit 150, such as a CPU.

The first clock signal on the first node 34 of the signal generator 30 and its duty cycle are expected to be totally independent of the position of selector 44. When this is the case, the edges in curve 45 of the signal on the output node 36 will be only originating from the transmitted light 11 changing phase each time that selector 44 is switched to its next position. At the end of each relaxation period, the signal on output node 36 has to be sampled, as indicated on curve 45 in FIG. 2. During the first relaxation period 47, when by selector 44 buffer input node 10 is connected to second node 37, the value at output node 36 of demodulator module 35 should converge to a first end value in a relatively short time period, preferably in about half the relaxation period (e.g. 0.5 ms). In the subsequent part, e.g. the subsequent halve, of the relaxation period, that value can then be sampled, e.g. at a first sampling moment 52. During a second relaxation period 48, buffer input node 10 is connected to third node 38 of the signal generator 30 through selector 44. From then on, the light of light source 15 is driven 180° out of phase with respect to the first clock signal on first node 34 of the signal generator 30. The phases 90° and 270° are subsequently treated similarly in subsequent third and fourth relaxation periods 49 and 50 respectively. By measuring each second half of the relaxation period, the responses at 0°, 180°, 90° and 270° phase can be sampled at first to fourth sampling moments 52, 53, 54, 55 respectively. Dividing the difference between the first two samples taken at the first and second sampling moments 52 and 53 by the difference of the last two samples taken at the third and fourth sampling moments 54 and 55, and taking e.g. the arctangent of the result, a measure for phase retardation due to the light's TOF is obtained. Using the speed of light will deliver the sought distance estimate. When having full 2D-arrays of these detectors each having their own circuitry, the full second half of the relaxation period can be used for reading out the full array, or part of the full array in e.g. a sequential form, i.e. pixel after pixel in a row, and row after row.

Having four relaxation periods of 1 ms, distance estimates can be calculated 250 times per second. As aforementioned, shorter or longer relaxation periods can be used. Very long relaxation periods are however more difficult to implement, since as will be shown further on, a filter 71 will have to average out over longer periods. The use of very long integration periods by having a large relaxation-period is further not recommended since variations of background light intensity may destroy the coherence in the subsequent phase measurements. A relaxation period between 10 ms and 50 ns is therefore advised. However, an attached calculating unit such as a CPU can average out the samples of each phase, or it can average out the difference between pairs of samples, or it can average out the estimated distance on a period as long as wanted for the given application. More elaborate calculations and estimations can be implemented as algorithms in the attached calculating unit. It can for example check the consistency of subsequent derived phase estimations, and as such generate a signal that is representative for the certainty of the achieved distance/phase estimate. The amplitude 51 of the small signal voltage on output node 36 of demodulator module 35 is proportional to the amplitude of ML-current 73, whereby the trans-impedance gain is dependent on the BL-current 74.

For obtaining a value related to the average light input power, being determined mainly by the BL 31, a signal relating to an average light signal can be made available directly from the demodulator module 35 at average light signal node 42. On the other hand, the average voltage 46 on output node 36 is depending on this level of the BL 31 as well, and can thus also be used for obtaining the average light input power or a value related thereto.

The demodulator module 35 may further comprise a gain node 41, which can be used for lowering the trans-impedance gain by several orders of magnitude when measuring short distances leading to high light levels of the ML 12, and thus to high ML-currents 73. A gain input signal at the gain node 41 can be used when the amplitude 51 of the sampled signal on output node 36 becomes too large for remaining in a linear domain of operation. Optionally, this gain node 41 can be driven by an auto-gain circuit 59 that will regulate or limit said transimpedance gain based on its input signal on output node 36. This can be organised by having a local auto-gain system on the circuitry level. However, in two dimensional arrays, it is also an option (not shown in the drawings) that each pixel samples and holds a digital or analog gain value delivered to each pixel by the calculating unit. In other words, at the moment when reading out a pixel, the calculating unit may have the circuit elements to determine the gain for each pixel separately by transferring to each pixel an analog or digital value that fixes the gain for measurement(s) to follow for that particular pixel. In a simpler implementation, the gain node 41 can be implemented as a common node for all pixels for 1D and 2D arrays of range finders.

Further, if implementation of a 1D or 2D array of demodulators 35 is envisaged, the outputs of all demodulator modules at output nodes 36 preferably have to be sampled during the second half of each relaxation-period, being, in the example given above, during the second half of each of the first to fourth periods 47, 48, 49, 50. The thus obtained sampled values can then be collected in a frame buffer in the attached calculating unit, e.g. CPU. The signal on the average light signal nodes 42 will then deliver a classical grey value image of the scene 9.

In some particular situations it can further be preferred to sample the values at output node 36 on first to fourth sampling moments 52, 53, 54, 55 (and their subsequent cycles) through extra transistor mixing means on capacitive voltage nodes that integrate for each phase the average voltage value of that phase over a multitude of cycles. This would be at the expense of extra pixel circuitry present in preferably each pixel. However the required A-to-D conversion rate would be lowered significantly and an enhanced signal-to-noise ration can be expected.

FIG. 3 shows a preferred embodiment 35A of a demodulator module 35 in case when a transistor-mixer-method is used. Photodetector 63 can be any type of conversion element converting light signals impinging on the photodetector into electrical signals. Preferably photodetector 63 is formed by an N-well in a p-type substrate when using a standard CMOS technology. In the example given in FIG. 3, photodetector 63 is connected between a node 66 and ground level. Photodetector 63 receives reflected modulated light (ML) 12 and background light (BL) 31. These light-inputs are converted into photodetector currents, being the ML-current 73 and the BL-current 74 signals respectively, flowing through node 66, which is also an input to a variable trans-impedance converter 72A. Further a gain regulating current source 64 for generating a gain regulating current 75 is coupled in parallel to the photodetector 63. The gain regulating current source 64 can be set by a gain input signal on gain node 41. The function of the variable transimpedance converter 72A is of two kinds: on the one hand it converts the incoming current on node 66 into an average voltage signal on conversion node 65, which is representative for the sum of BL-current 74 with the gain regulating current 75; and on the other hand it also generates a small signal voltage on this conversion node 65 that follows the ML-current 73. Thereby, the small signal transimpedance gain depends on the sum of the BL-current 74 with the gain regulating current 75. In the implementation of the variable transimpedance converter 72A this is clearly the case. First and second transistors 60 and 61 are coupled in series to node 66, each connected as diode, and with higher bias current their transimpedance capability decreases since their transconductance $g_m$ increases. The more diodes like diode 60 and 61 are placed in series, the larger the transimpedance gain will be. However, there is limited voltage headroom, and only two to three diodes can typically be used for a given power supply voltage and BL 31 range.

At low ML-currents 73, gain regulating current source 64 has to be turned off. Then, the current determining the operation of the variable transimpedance converter 72A will be the BL-current 74. This current will set the bias operating points of node 66 and of a conversion node 65. Optionally a transistor 62, coupled between node 66 and the series connection of the first and second transistors 60, 61, can serve as a cascode transistor. Conversion node 65 is the node between the cascode transistor 62 and the second transistor 61. As long as first and second transistors 60 and 61 operate in weak-inversion a logarithmic conversion from BL-current 74 to the average voltage on node 65 is obtained. This weak inversion operation zone is preferred, however, for extreme large BL-currents 74, transistor 62 and first and second transistors 60 and 61 may also operate in their strong inversion regions, as long as conversion node 65 and node 66 do not saturate. The average voltage signal on conversion node 65 can be low pass filtered by a low-pass filter 76, for bringing out a signal on average light signal node 42 that gives information about the level of BL 31.

On top of the average voltage signal on node 65, a small signal 77 (in the order of 1 µV up to 1000 mV) is present from the ML-current 73. This ML-current 73 is assumed to be at least an order of magnitude smaller than the BL-current 74. If that is not the case, gain regulating current 75 can be turned on at a small current level. Depending on the magnitude of the low frequency BL-current 74, the conversion from ML-current 73 to a small-signal voltage on conversion node 65 will be set. This is very useful. A high BL-current 74, will deliver a high associated shot-noise current. Shot-noise is the inherent noise that derives from the stochastic nature of the detected photon flux input light, and is proportional the square root of the light intensity. This shot-noise will be the prevailing noise source in the system as long as a considerable amount of BL 31 is present. The higher this shot-noise level, the higher the required ML-current 73 must be for reaching a given signal to noise ration (SNR). To support this, it is useful to have a dimmed transimpedance conversion between ML-current 73 and the voltage signal output on conversion node 65.

When there is less BL-current 74, the required ML-current 73 for measuring at a given SNR will decrease since the shot noise decreases, and low levels of ML-current become useful as well. In this case it is advantageous to have a higher transimpedance gain, since otherwise the average voltage signal 77 will become too small to be further processed without adding too much noise from the attached subsequent circuit (here for example the amplifier 67). So by having a transimpedance gain for the ML-current 73, that varies with the background light BL 31, the gain at low ML-currents 73 is automatically regulated and dynamic range enhanced. When simulating such situations, for example with a Spice simulator, circuit elements can be designed such that SNR can be acceptable in a wide operational range of BL 31 and ML 12.

At the other side of the dynamic range, when dealing with large ML-currents 73, which is occurring when a scene or objects in a scene are located at very short distances, or when BL-current 74 is smaller than ten times the ML-current 73, then current source 64 can be turned on at a level such that the output oscillation of the average voltage signal 77 remains small enough and that conversion node 65 doesn't saturate. In this way, a large range of amplitudes for ML-current 73 become measurable. A range of four orders of magnitude is at least feasible, corresponding with a distance variation of a factor of 100. E.g. a measurement range between 10 cm and 10 m can then be supported.

Figure 8A:
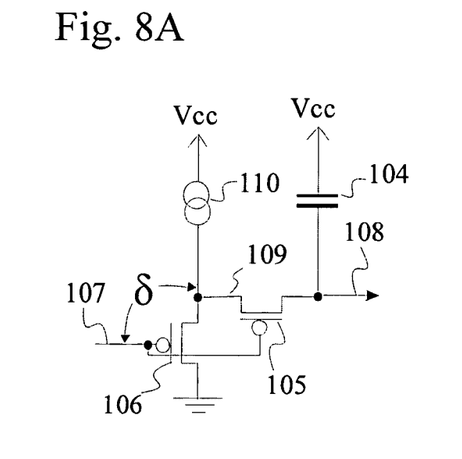
FIG. 8A is an embodiment of the present invention of a compact low-pass filter with tuneable bandwidth.

A mixer 69, e.g. a Gilbert Multiplier, which is a multiplier cell comprising a series connection of an emitter coupled transistor pair with two cross-coupled emitter coupled transistor pairs, can multiply the signal coming from the variable transimpedance converter 72A (optionally through an amplifier 67 coupled between the conversion node 65 and the mixer 69) with the first clock signal on first node 34. The resulting signal on node 70, the output node of mixer 69, is then low-pass filtered by low pass filter 71, generating the output signal on output node 36. For obtaining a signal on the output node 36 like curve 45 (FIG. 2) the targeted rise and fall times should be about 35% of the relaxation period to ensure (with some margin) stable date after 50% of the relaxation period. In the 1-ms example, rise and fall times of 0.35 ms would thus be targeted, meaning that a low-pass filter 71 is preferred having a −3 dB corner frequency at 1 kHz (as is known by the person skilled in the art). In FIG. 8A a preferred low-pass filter is depicted that requires very small semiconductor material area, e.g. silicon area, aiming at a high resolution camera system that can be used in low pass filter 71.

FIG. 4 shows a preferred embodiment of the present invention when using a substrate-mixer-method. In this case the BL 31 and the ML 12 are incident on an area of the substrate, whereby the photo-generated minority carriers are directed towards one or another detecting diode-junction. The signal on first node 34 is here determining for where the photo-generated minority carriers will be collected. FIG. 4 can be a representation of a practical way to obtain TOF-measurements using a mixer/detector 80, where the photo-generated minority carriers are either diverted or attracted to the cathode of mixer/detector 80 (coupled to a node 66), depending on the first clock signal or clock reference signal on the first node 34. Again there will be BL-current 74 and ML-current 73. ML-current 73 is this time the current that is present due to the modulated light having been mixed with the first clock signal on the first node 34 in the substrate detector/mixer 80. ML-current 73 component is still originating from to the incident modulated light, and carries therefore the same name. In this set-up, the BL-current 74 is also mixed with the reference signal 34. This BL-current 74 can be very large with respect to the ML-current 73. By mixing the BL-current 74 in the detector/mixer 80, a large oscillating current at the clock signal frequency, e.g. 10 MHz, will be present. It is therefore advised to place a capacitor 84 between ground level and node 66, for averaging out this high-frequency component. A gain regulating current 75 may be generated by gain regulating current source 64 set by a gain input signal on gain node 41. A variable transimpedance converter 72B is used to bias conversion node 65 and average light signal node 42 depending on the sum of the average BL-current 74 with the gain regulating current 75. An optional transistor 62 coupled between node 65 and node 66 can serve as a cascode transistor. The small signal output on conversion node 65 follows the ML-current 73. The transimpedance gain, again being the ratio between the voltage signal 83 on the conversion node 65 and the ML-current 73, is determined by the magnitude of the sum of the average BL-current 74 with the gain regulating current 75. When the gain regulating current 75 is turned off, again for decreasing BL-current 74, a larger trans-impedance gain for the ML-current 73 becomes available, being very useful for the increase in sensitivity that is available due to the lower Shot-Noise associated to the lower BL-current 74. For very high inputs of ML 12, the gain regulating current source 64 can be turned on and regulated to limit the amplitude of the voltage signal 83 at node 65. The latter amplitude can be in the range of 100 $\mu$V to 2000 mV. Attached low-pass filter 71 can be used for averaging the remaining signal noise. Again, for relaxation periods of 1 ms, with rise and fall times of 0.35 ms, a 1 kHz low-pass 71 is advised. In some cases it can suffice to make band-pass filter 71 utilising the high impedance of conversion node 65 in a simple RC first order filter, whereby only one additional capacitor is required.

Variable transimpedance converter 72B, as shown in this FIG. 4, is in this example chosen somewhat different from the variable transimpedance converter 72A, from FIG. 3. However converter 72A can be used as well in FIG. 4 and converter 72B can be used as well in FIG. 3. Converter 72B has the advantage of having additional internal gain. Resistor 86 and capacitor 87, connected so as to form a low pass filter 89, can be determined such that their associated time constant is far below 100 Hz, as can be determined by the person skilled in the art. In that case, the variations in voltage signal 83 on conversion node 65, would not significantly change the voltage on signal node 42. At conversion node 65, transistor 85, coupled between the low-pass filter 89 and conversion node 65, would then be seen as a diode with $g_m$-conductance for BL-currents 74 (assumed slowly varying), and with $g_o$-conductance for faster oscillating currents, like for the useful frequency component in the ML-currents 73, typically being around 500 Hz when having a relaxation period of 1 ms. When this is the case, a gain of 20-100 can be achieved for the small signal leading to an amplified voltage signal 83 on conversion node 65. With such an arrangement, the ML-current signal 73 is amplified in a first stage, to a voltage signal, with a much larger amplitude than obtained with a diode construction (like in the variable transimpedance converter 72A with the series connection of two transistors 60 and 61 connected as diodes).

Figure 5A:
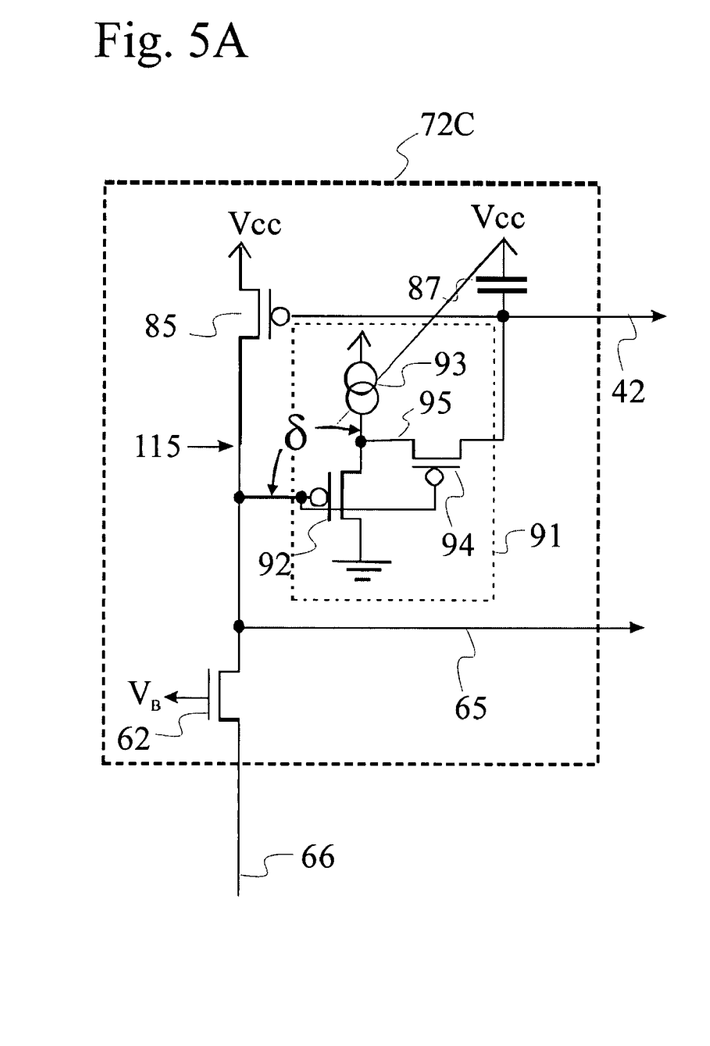
FIGS. 5A and 5B show practical implementations 72C and 72D of the variable transimpedance converter 72B.
Figure 5B:
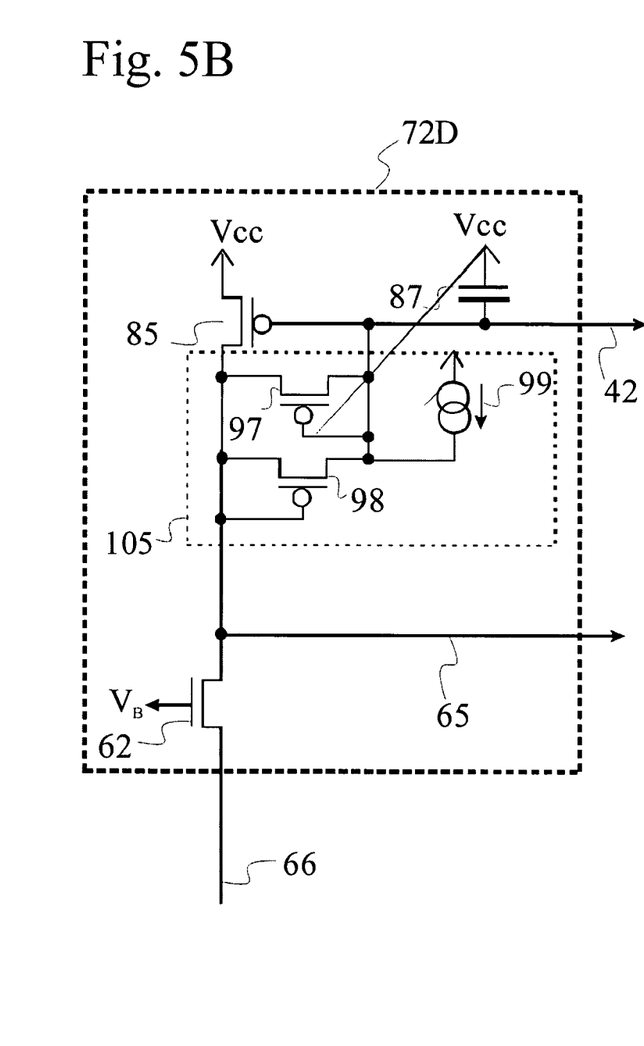
Figure 6:
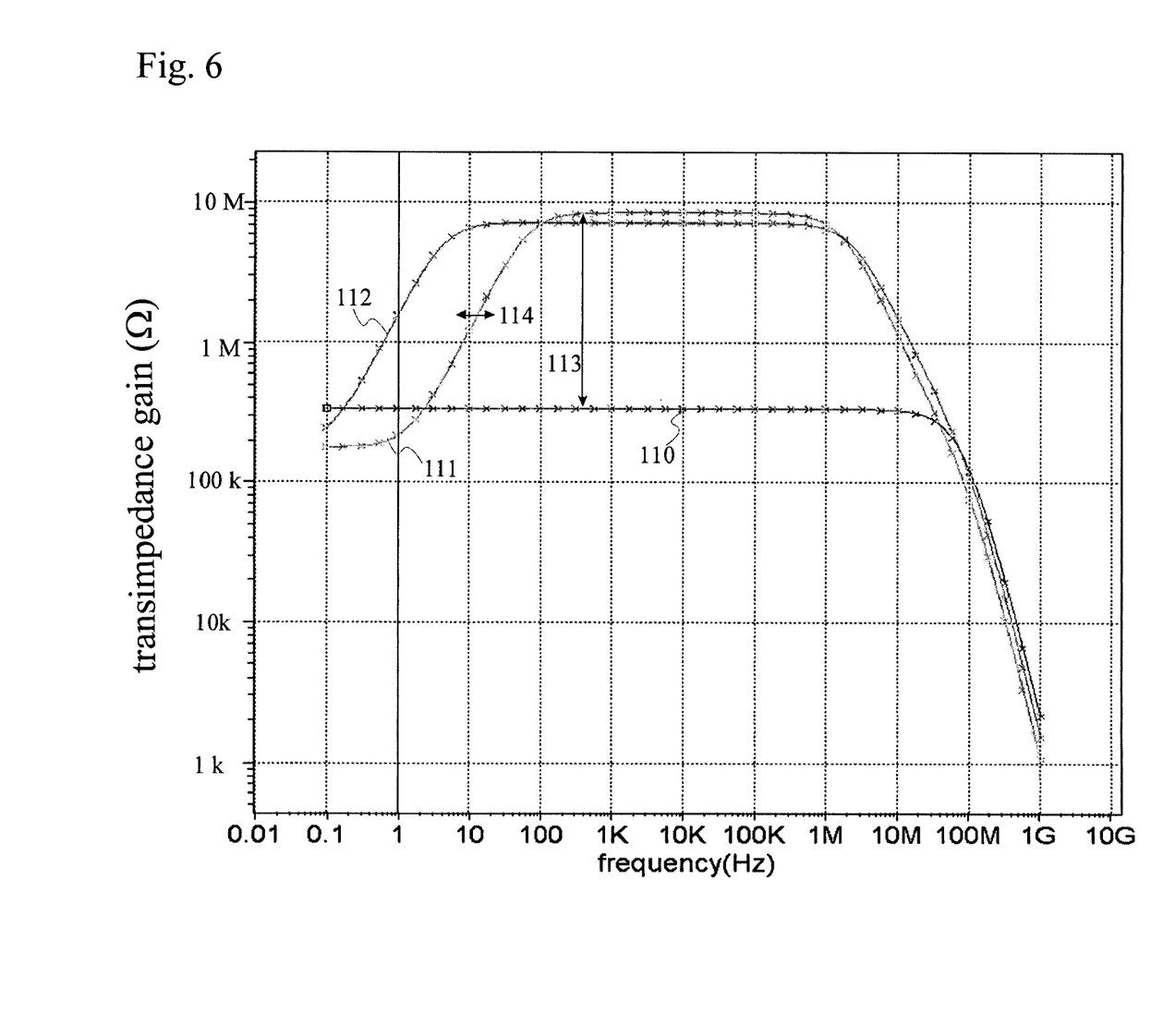
FIG. 6 illustrates the transimpedance gain of the variable transimpedance converters 72A, 72C and 72D illustrated in FIGS. 3, 5A and 5B respectively.

Variable transimpedance converter 72B is somewhat difficult to implement, since it would require a very large resistor 86 in the 10MΩ-10GΩ range and/or a very large capacitor 87 in the pF to nF range. FIGS. 5A and 5B show two implementations 72C and 72D for practical implementation of the variable transimpedance converter 72B of FIG. 4 on a small area, thus saving substrate space, e.g. silicon space. Capacitor 87 is still present, and can be implemented using the gate capacitance of e.g. a PMOS transistor with its source and drain terminals connected to supply voltage Vcc. Resistor 86 is now replaced by a resistor circuit 91 comprising a transistor 94 that is held preferably in sub-threshold regime by active gate voltage regulation. The high resistance is derived from using the linear regime of the transistor, sometimes also called the triode region of operation, now held at sub-threshold condition. A transistor 92 together with a current source 93 form a voltage follower, with output node 95 connected to transistor 94 that is serving as said large resistance. A gate source voltage δ over transistor 92 is designed to be small, by having a large W/L aspect ratio of for example 10 for transistor 92. Current source 93 can be chosen small, e.g. 1-100 nA. Aspect ratio W/L of transistor 94 is preferably small, like ⅕. On FIG. 6, curve 111 shows the resulting transimpedance gain between small signal input current through input node 66 and small signal voltage signal on conversion node 65. Current source 93 can be used to determine the position in frequency of the positive slope in the curve 111 shifting the edge left or right, as represented by arrow 114. Curve 110 illustrates the transimpedance of the diode solution provided by the transimpedance converter 72A. All curves on this FIG. 6 are for a BL-current of 1 μA. The distance 113 between curve 110 and 111 demonstrates the increase in gain by a factor of 25 by using variable transimpedance converter 72C of FIG. 5A instead of transimpedance converter 72A of FIG. 3.

Variable transimpedance converter 72D, as represented in FIG. 5B, has similar gain as transimpedance converter 72C represented in FIG. 5A, both about 8 MΩ, however it has the merit of being very small, which is preferred when designing a pixel e.g. for a 3D camera, where resolution and small pixel size are important. The resistor circuit 105 is formed in this implementation by two diodes and a current source 99. The two diodes, for example implemented by PMOS transistors 97 and 98, are connected as anti-parallel diodes. Capacitor 87 keeps the gate voltage of transistor 85 to a more or less fixed level at higher frequencies. Current source 99 symbolises the leakage towards the Vcc, due to the attached drain/source diffusion of transistors 97 and 98, at the femto-ampere level. This system is auto-biasing, the transimpedance between input current on node 66 and small signal output voltage on conversion node 65 shown in FIG. 6 by curve 112. The positive edge is at about 1 Hz, and this frequency can possibly be altered by changing the current of source 99, however this femto-ampere level is difficult to control. Curve 111, obtained by using the implementation of transimpedance converter 72C as in FIG. 5A, has the advantage that currents up to 100 Hz get attenuated, meaning that BL 31 variations are getting attenuated more easily as well, however its required semiconductor material area, for example Si-area, for implementation is largest. When it is useful to position the positive edge of curve 111 precisely, as indicated by arrow 114, independent of process value parameters and temperature, the current through current source 93 can be driven by a replica biasing circuit or regulated through a calibration procedure.

Besides the transimpedance converters 72A, 72B, 72C, 72D, as illustrated in FIGS. 3, 4, 5A and 5B, other small circuits can be configured. A useful option is to insert at position 115 in FIG. 5A a PMOS transistor in cascode configuration. This will increase the gain with a factor 10, in the example given from 8 MΩ to at least 80 MΩ. The person skilled in the art can work this out further and adapt the transimpedance converters 72A, 72B, 72C, 72D to its specifications.

Figure 7:
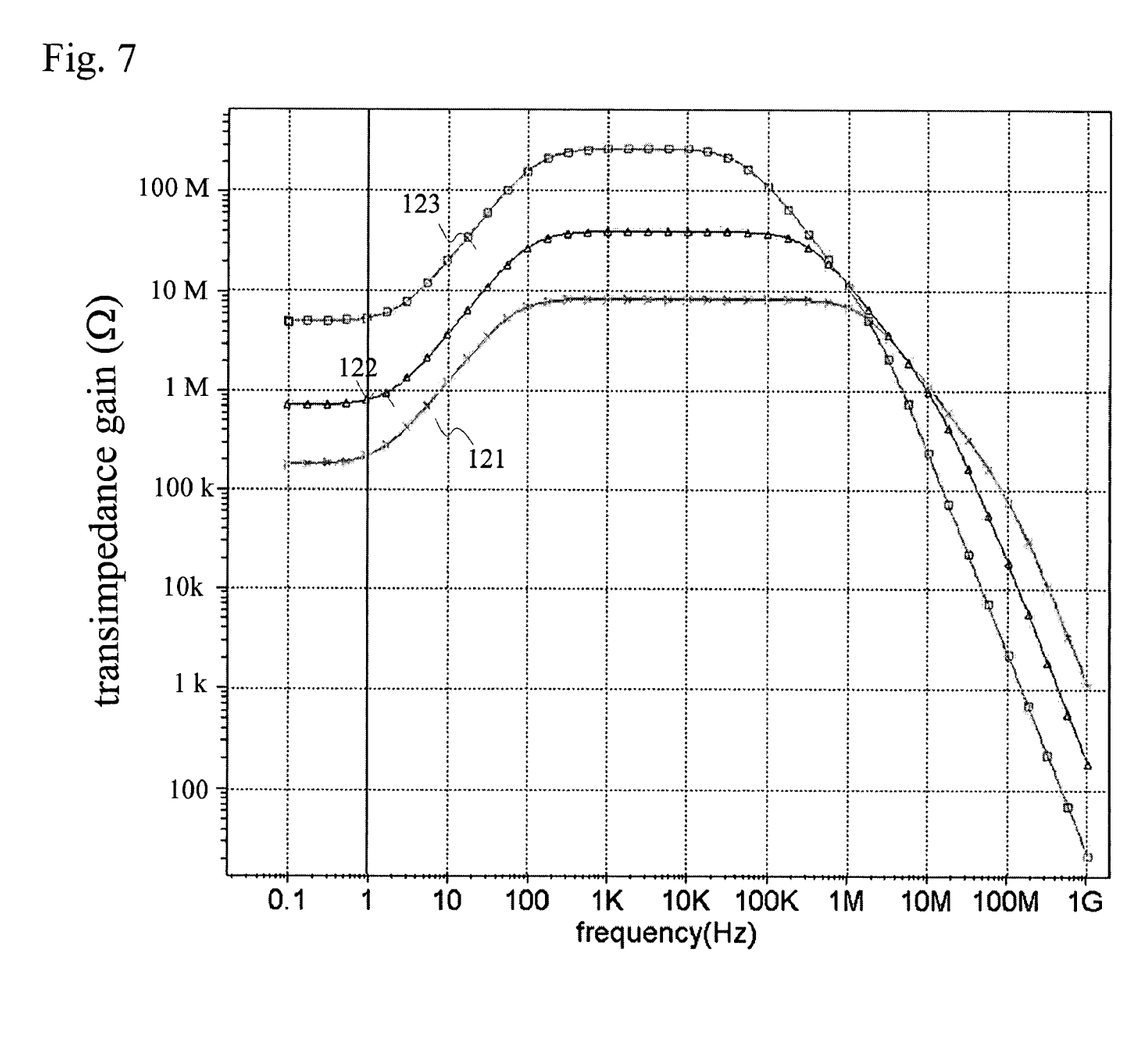
FIG. 7 demonstrates that at lower background light (BL) current levels, the transimpedance gain becomes higher.

FIG. 7 shows the merit of varying the transimpedance gain of variable transimpedance converter 72C by changing the level of the BL 31. Curves 121, 122 and 123 are for BL-current 74 of 10 μA, 1 μA and 100 nA respectively. It can be seen from the curves that the transimpedance gain increases by a factor of 4-5 per decade decrease in level of BL-current 74. The prevailing noise factor when having BL 31, is the shot-noise in the BL-current 74 and that is decreasing by a factor of 3.2 per decreasing decade of BL 31. These factors nearly match, such that the increase in sensitivity at lower levels of BL 31 can easily be exploited.

FIG. 8 shows in more detail how a low-pass filter 89 can be constructed with a −3 dB frequency that is in the range of 10 Hz to 10 kHz and that can be implemented on a small chip area. It is essentially the same as the low-pass construction formed by circuit 91 with capacitor 87 in FIG. 5A. The explanation is somewhat extended here for helping a person skilled in the art to understand the implication and the use of this filter more thoroughly.

Figure 8B:
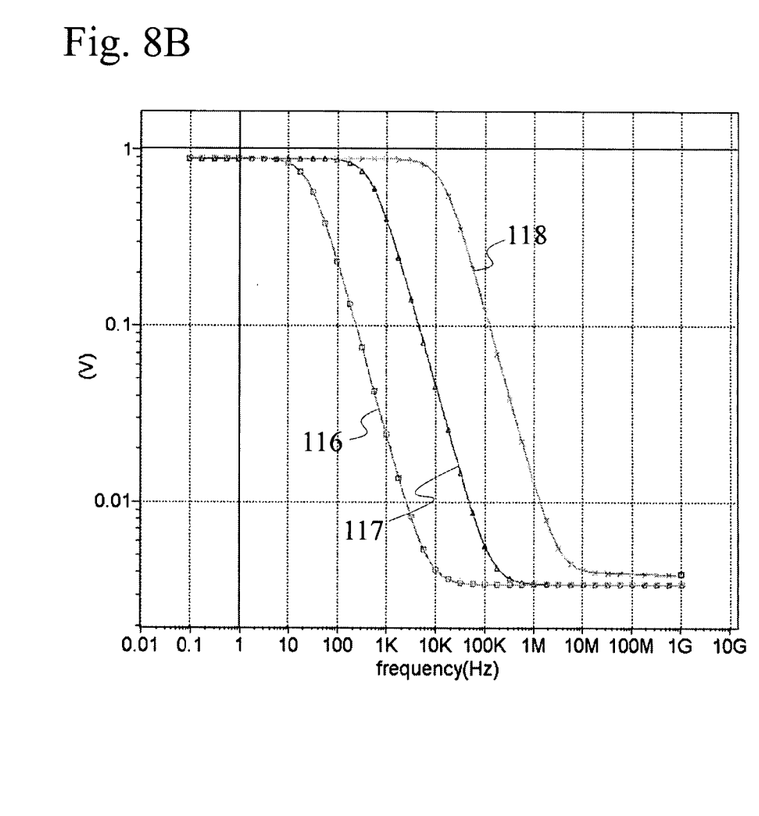
FIG. 8B shows the low-pass filter characteristic for various bias currents.
Figure 8C:
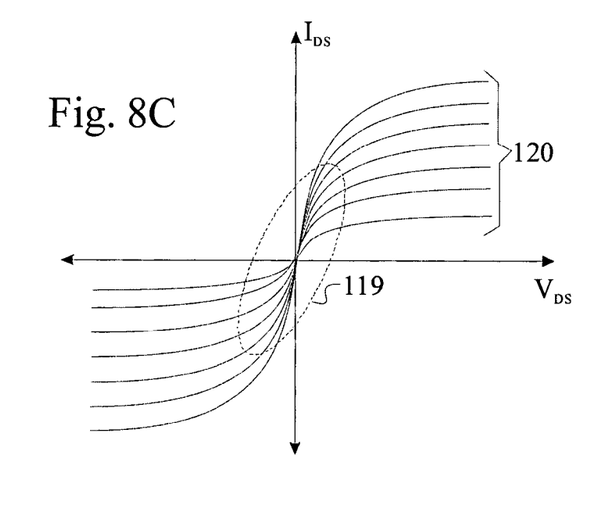
FIG. 8C shows the preferred domain of operation of the transistor 112 in the low-pass filter of FIG. 8A.
Figure 9A:
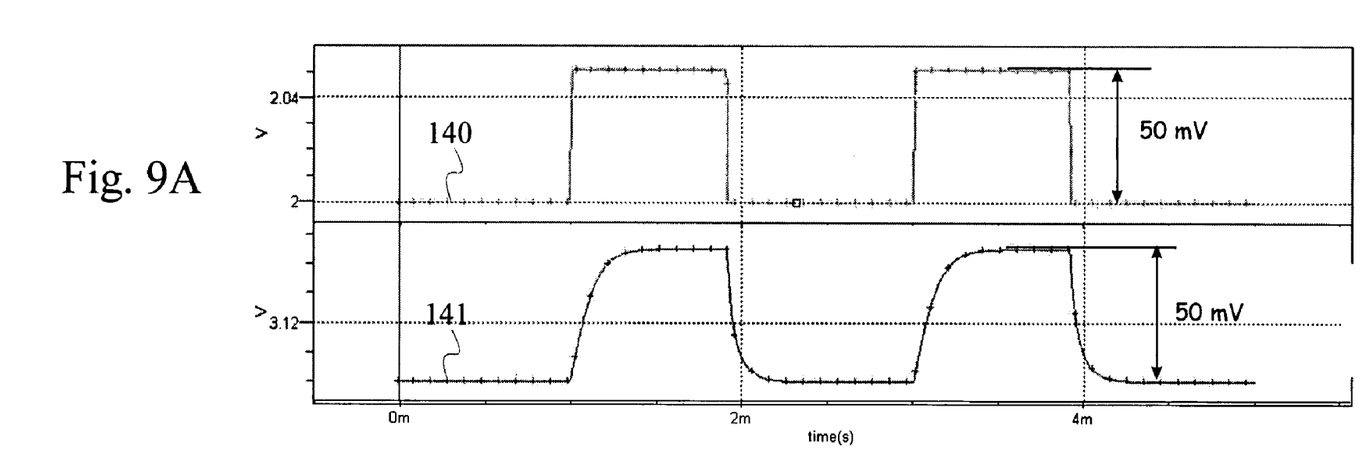
FIG. 9A illustrates a step of 50 mV on the input 114 of the circuit of FIG. 8A and its step-response.
Figure 9B:
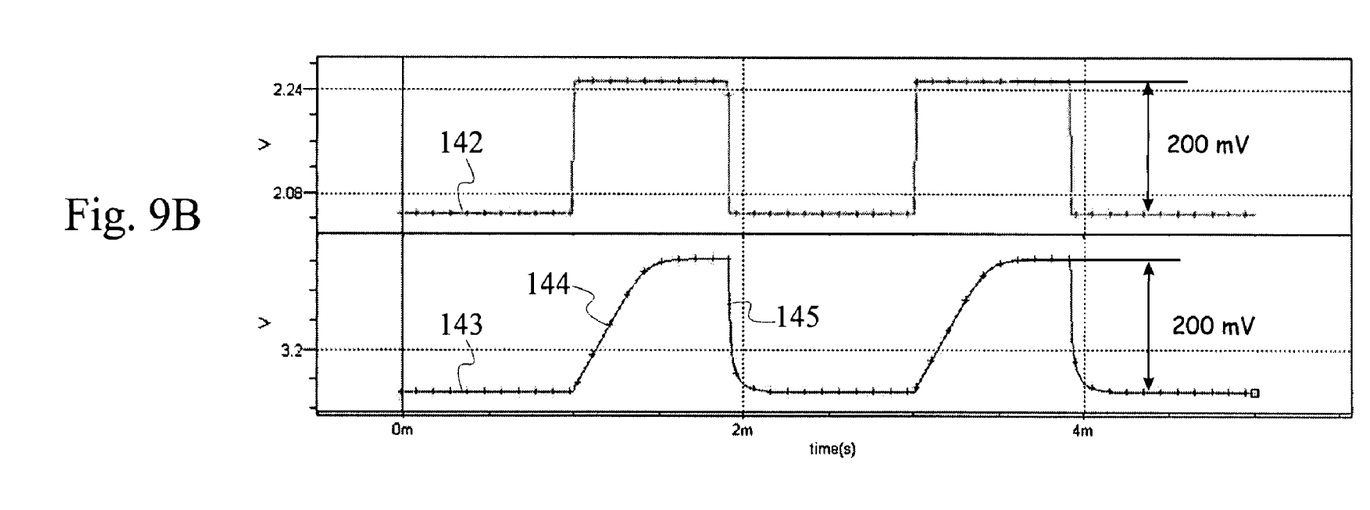
FIG. 9B illustrates a step of 200 mV on the input 114 of the circuit of FIG. 8A and its step-response.

Compared to a first order low-pass filer based on e.g. an RC filter, a filter of the present invention, as illustrated in an embodiment in FIG. 8A, has the feature that the −3 dB frequency is programmable by a settable current. PMOS transistor 106 forms together with current source 110 a voltage follower. Output node 109 of the voltage follower follows the input voltage at input node 107 of the voltage follower, be it with a small voltage δ higher. By keeping W/L of transistor 106 of the voltage follower high enough, e.g. at least a factor of five, and by keeping the current of the current source 110 low, the voltage 6 over transistor 106, between gate and source will be below-threshold. PMOS transistor 105 will then be biased most of the time below threshold as well. Output voltage on output node 108 of the low pass filter, will then slowly follow the voltage on output node 109 of the voltage follower. For small signal amplitudes, up to about 50 mV, curves 116, 117 and 118 in FIG. 8B demonstrate the low-pass behaviour for currents of current source 110 with a value of 10 nA, 100 nA and 1 μA respectively. For small signal amplitudes, transistor 105 is always in its linear (also called triode) regime, indicated in FIG. 8C by 119. To explain large signal behaviour more in detail, simulations have been made when flowing a current of 350 nA through current source 110. The small signal −3 dB frequency is then 2 kHz. With small step-inputs of e.g. 50 mV on input node 107 of the voltage follower, as illustrated by input curve 140 in FIG. 9A, the output voltage curve 141 on output node 108 of the low pass filter follows with rising and falling edge times of about 175 μs. This is consistent with a simple first order linear RC-filter. However, at a large step upwards (illustrated in curve 142), say of 200 mV, applied on input node 107 of the low pass filter, the output signal on output node 108 will follow only very slowly, as illustrated by curve 143, visible at edge or slope 144. By a step downwards of 200 mV, output node 108 will follow very quickly (edge 145 on curve 143), since transistor 105 will see an enlarged voltage between output node 108, at that moment being its source, and its gate-node 107. Transistor 105 will conduct strongly during the falling edge. In other words, the construction in FIG. 8A has a peak-detecting capability for larger signals, since for falling edges, the output follows relatively quickly, and for rising edges, the output follows slowly. For small signals, below 50 mV, the small signal analysis is valid, and the curves 116, 117 and 118 correctly demonstrate the tuneable properties.

This filter can be used like in variable trans-impedance converter 72C in FIG. 5A (with circuit 91 & capacitor 87), where the non-linear large signal behaviour is not harmful for good operation of the structure. The effects can also easily be simulated, since spice-circuit simulators will include large non-linear transient effects with enough precision.

Further, when using this filter as low pass filter 71 in FIG. 3, the filter can be of great help, since such filter will still middle out the noise, which has typically a value smaller than 50 mV. The effects of the unwanted non-linear peak detecting behaviour for larger signals have to be limited and taken into account in the design phase. One receives the tuneability and the small circuit area in return. Both are very useful elements in 3D camera systems where pixel area has to be minimised, and where by choosing the averaging time constant, one can choose between higher frame rate or better precision.

For implementation of the low-pass filters in the present invention, it is further an option to use capacitors that are partly transparent for the incident light. A wavelength of choice for the ML 12, is near infrared light, with wavelength in the range of 820 nm to 1000 nm. This is not visible for the human eye, and can still be absorbed in Silicon. Its penetration depth is about 15 micron, meaning that it can eventually travel through thin layers of silicon without showing too much loss. Many CMOS technologies offer the use of poly-poly capacitors, i.e. capacitors between two thin poly-silicon plates. These plates typically have a thickness of 500 nm, such that a poly-poly capacitor can have in total a thickness of about 1 micron. This will only absorb about 5-7% of the incident ML when having a wavelength of 890 nm. By covering a part of the photodetector 63 or modulator/detector 80 with a poly-poly capacitor one can achieve a relative large capacitance for low-pass filtering or averaging purposes.

The invention claimed is:

1. A method for measuring time of flight of radiation, the method comprising emitting modulated radiation in response to a first modulation signal, projecting the modulated radiation onto a scene,
   receiving radiation, the received radiation comprising a first portion being the modulated radiation reflected by the scene and a second portion being background radiation,
   converting the received radiation into a radiation induced current signal on a conversion node, mixing the radiation induced current signal with a second modulation signal, and converting the mixed signal into a first and a second signal component, the first signal component being dependent on the reflected modulated radiation and the second signal component being indicative of the background radiation,
   determining a small signal component of the first signal component, following the reflected modulated radiation, and
   determining the time of flight of the radiation based on the small signal component of the first signal component.

2. A method according to claim 1, furthermore comprising converting the radiation induced current signal into the first and the second signal component, the first and the second signal components being voltage signal components.

3. A method according to claim 1, said radiation induced current signal consisting of charge carriers flowing in a substrate, wherein the mixing of said radiation induced current signal with said second modulation signal is performed in the substrate.

4. A method according to claim 1, wherein the second modulation signal comprises substantially the same modulation as the first modulation signal, but is time-shifted.

5. A method according to claim 2, whereby the second voltage signal component consists essentially of the average voltage on the conversion node.

6. A method according to claim 2, whereby the first voltage signal component consists essentially of the small signal voltage on the conversion node.

7. A method according to claim 1, wherein converting the received radiation into the first and the second signal components is carried out with a first and a second conversion gain respectively.

8. A method according to claim 7, furthermore comprising increasing the first conversion gain for decreasing background radiation levels.

9. A method according to claim 7, wherein the first conversion gain is a factor of 20 to 100.

10. Use of a method according to claim 1 for a distance measurement.

11. A device for measuring time of flight of radiation, comprising
    a radiation emitting source,
    a modulating device for modulating, in response to a first modulation signal, radiation emitted by the radiation emitting source,
    a radiation receiver for receiving radiation, the received radiation comprising a first portion being the modulated radiation reflected by a scene and a second portion being background radiation,
    a conversion means for converting received radiation into a radiation induced current signal on a conversion node,
    mixing means for mixing said radiation induced current signal with a second modulation signal, and a converter means for converting the mixed signal into a first and a second signal component, the first signal component being dependent on the reflected modulated radiation and the second signal component being indicative of the background radiation, and
    a calculation unit for determining the time of flight of the radiation based on the first signal component,
    wherein the conversion means is adapted for generating a small signal component of the first signal component, the small signal component following the reflected modulated radiation, and wherein the calculation unit is adapted to determine the time of flight of the radiation based on the small signal component of the first signal component.

12. A device according to claim 11, wherein the conversion means comprises a photodetector for converting the received radiation into a radiation induced current signal.

13. A device according to claim 11, wherein the conversion means comprises amplifying means for amplifying the first portion of the received radiation for generating the first signal component.

14. A device according to claim 11, furthermore comprising a variable transimpedance converter for converting the radiation induced current signal into the first and the second signal components, the first and the second signal components being voltage signal components.

15. A device according to claim 11, wherein the second modulation signal comprises substantially the same modulation as the first modulation signal, but is time-shifted.

16. A device according to claim 11, the conversion means having a first and a second conversion gain for converting of the received radiation into the first and the second signal components respectively, the device furthermore comprising a gain input terminal for influencing the first conversion gain.

17. A device according to claim 11, furthermore comprising a low-pass filter.

18. A device according to claim 17, wherein the low-pass filter uses a MOS-transistor in its triode region as a means for achieving a large resistance.

19. A device according to claim 17, wherein the low-pass filter uses a MOS-transistor in its sub-threshold regime as a means for achieving a large resistance.

20. A device according to claim 17, wherein the low-pass filter uses a parasitic current leak for achieving a low −3 dB corner frequency of the filter.

21. A device according to claim 17, wherein the low-pass filter uses a poly-poly capacitor that is at least partially transparent for the first portion of received radiation.

* * * * *